United States Patent [19]
Hughes et al.

[11] Patent Number: 4,918,603
[45] Date of Patent: Apr. 17, 1990

[54] COMPUTERIZED STATISTICAL FOOTBALL GAME

[75] Inventors: Patrick Hughes, 2322 Cedar La., Vienna, Va. 22180; Michael Hughes, 6203 Danrobbin Dr., Bethesda, Md. 20815; David Yager, 1908 Wilson La., #101, McLean, Va. 22102

[73] Assignees: Michael B. Hughes, Bethesda, Md.; Patrick J. Hughes, Vienna; David C. Yager, McLean, both of Va.

[21] Appl. No.: 226,724

[22] Filed: Aug. 1, 1988

[51] Int. Cl.$^4$ .......................................... G06F 15/44
[52] U.S. Cl. ...................................... 364/410; 273/94
[58] Field of Search .................................... 364/410–412; 273/55 R, 55 A, 55 B, 55 C, 85 R, 94

[56] References Cited

U.S. PATENT DOCUMENTS

| 4,496,148 | 1/1985 | Morstain et al. | 273/94 |
| 4,662,635 | 5/1987 | Enokian | 278/94 |

OTHER PUBLICATIONS

"Playnet", B. W. Behling, Ahoy, No. 25, pp. 81–84, Jan. 1986, (Abstract from Microsearch File of Orbit, AN: 86-031720).

"Low-Cost Electronic-Mail Service: Kangaroo Koncepts Will Start operation in First Part of 1983", Info World, vol. 4, No. 44, pp. 1–2, Nov. 8, 1982 (Abstract from Microsearch File of Orbit, AN: 82-000631.

"Information Utilities", Info World, vol. 5, No. 13, pp. 41–45, Mar. 28, 1983, John Markoff, (Abstract from Microsearch File of Orbit, AN: 83-004335.

Article from Washington Times, Feb. 8, 1988, Describing Pro-Football Franchise Game Advertisement for TGIFG game from TGIFG, La Jolla, Calif. from 1987 Street and Smith College Football Yearbook.

Article from USA Today, describing MSFL Pro League Football game.

All Pro Year Book–1987, Published by All Pro Publishing Co., Van Nuys, California Borchure for the All Pro-Year Book–1987.

Three Page Brochure for Strat-O-Matic Pro Football, from Stat-O-Matic Co., Inc. Glen Head, New York 11545.

Primary Examiner—Jerry Smith
Assistant Examiner—Gail O. Hayes
Attorney, Agent, or Firm—Dickstein, Shapiro & Morin

[57] ABSTRACT

A method and apparatus for playing football. The football game is played on a computer system and is based upon actual football performances by a database of football players. The computer football game is played by a league of individuals, each of whom can individually, or in groups, own a franchise. Franchises select their players from an initial draft. The starting players are then selected by individual franchise owners. Wins and losses for the computer football games occur by calculating a total of each individual player's points who make up a team. The calculation of points is done automatically either manually or using actual weekly performance by individual NFL players as the basis for determining points.

3 Claims, 20 Drawing Sheets

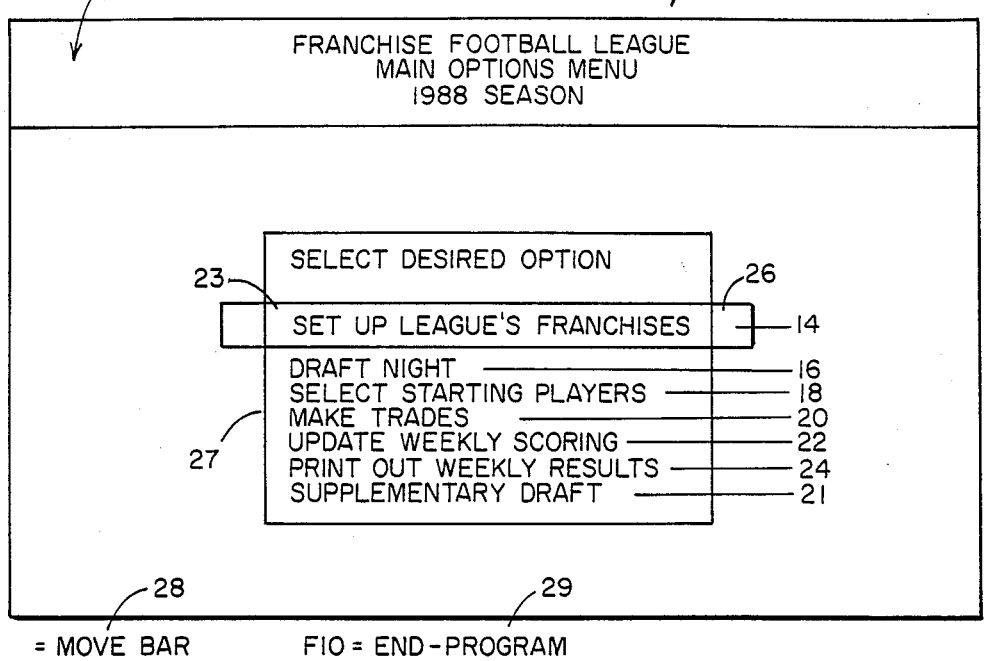
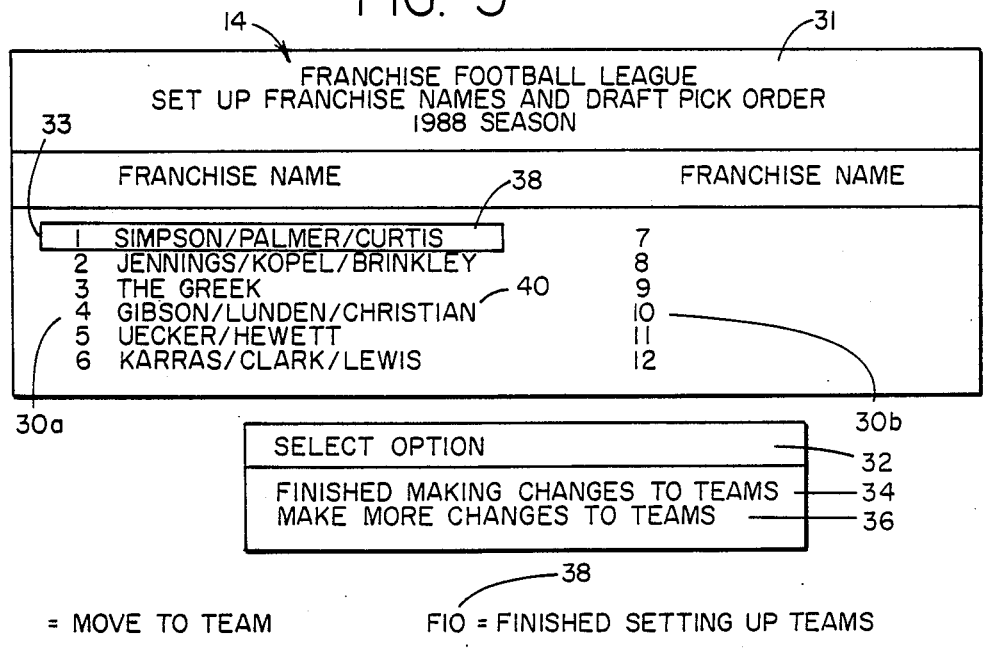

FIG. 4b

**FRANCHISE FOOTBALL LEAGUE
DRAFT SELECTION
1988 SEASON**

| POSN | AVAILABLE NFL PLAYERS<br>PLAYER | ROUND 26<br>FRAN: | SELECTION 2<br>JENNINGS/KOPEL/BRINKLEY |
|---|---|---|---|
| RB | BYARS, KEITH, PHILADELPHIA | RB | ANDERSON, GARY, SAN DIEGO |
| S | CHERRY, DERON, KANSAS CITY | WR | BAKER, STEPHEN, |
| TE | CHRISTENSEN, TODD, L.A. (RAI) | LB | BANKS, CHIP, |
| WR | CLAYTON, MARK, MIAMI | PK | BREACH, JIM |
| RB | COLLINS, TONY, NEW ENGLAND | S | BUMUSS, LLOYD |
| QB | CUNNINGHAM, RANDALL, PHIL. | DB | CASTILLE, JEREMIAH, |
| FB | DAVENPORT, RON, MIAMI | WR | CHANDLER, WES, |
| RB | DORSETT, TONY, DALLAS | LB | MERRIWEATHER, MIKE, |
| WR | DUPER, MARK, MIAMI | CB | POE, JOHNNIE, |
| QB | EASON, TONY, NEW ENGLAND | RB | SEWELL, STEVE, |
| CB | FELLOWS, RON, LOS ANGELES (RAI) | LB | SMITH, BILLY RAY, |
| PK | FRANKLIN, TONY, NEW ENGLAND | WR | STALLWORTH, JOHN, |
| WR | FRYAR, IRVING, NEW ENGLAND | QB | TESTAVERDE, VINNY, |
| RB | GALBREATH, TONY, NEW YORK (G) | RB | WARNER, CURT, |
| WR | GIVINS, ERNEST, HOUSTON | CB | DIXON, HANFORD, |

= MOVE BAR / PGUP PGDN F1=CHANGE ORDER F2=GO TO PLAYER F3=TEAM WINDOW
F4=DISPLAY DRAFTED PLAYERS F9=OTHER OPTIONS
F10=END DRAFT

FIG. 4d

FRANCHISE FOOTBALL LEAGUE
DRAFT SELECTION
1988 SEASON

AVAILABLE NFL PLAYERS                ROUND 26   SELECTION 2
                                     FRAN: JENNINGS/KOPEL/BRINKLEY

| POSN | PLAYER |
|------|--------|
| RB | BYARS, KEITH, PHILADELPHIA |
| S  | CHERRY, DERON, |
| TE | CHRISTENSEN, TODD |
| WR | CLAYTON, MARK, |
| RB | COLLINS, TONY, |
| QB | CUNNINGHAM, RANDALL, |
| FB | DAVENPORT, RON, |
| RB | DORSETT, TONY, |
| WR | DUPER, MARK, |
| QB | EASON, TONY, |
| CB | FELLOWS, RON, |
| PK | FRANKLIN, TONY, |
| WR | FRYAR, IRVING, |
| RB | GALBREATH, TONY, |
| WR | GIVINS, ERNEST, |

ENTER PLAYER'S NAME
STALLWORTH

ANDERSON, GARY, SAN DIEGO
KER, STEPHEN,
NKS, CHIP
EACH, JIM,
MUSS, LLOYD,
DB   CASTILLE, JEREMIAH,
WR   CHANDLER, WES,
LB   MERRIWEATHER, MIKE
CB   POE, JOHNNIE,
RB   SEWELL, STEVE,
LB   SMITH, BILLY RAY,
WR   STALLWORTH, JOHN
QB   TESTAVERDE, VINNIE,
RB   WARNER, CURT,
CB   DIXON, HANFORD,

= MOVE BAR   PGUP   PGDN   F1 = CHANGE ORDER   F2 = GO TO PLAYER   F9 = OTHER OPTIONS

FIG. 5b

FRANCHISE FOOTBALL LEAGUE
WEEK nn STARTING TEAM SELECTION
1988 SEASON

| TEAM: SIMPSON/PALMER/CURTIS | | WEEK | STARTING TEAM |
|---|---|---|---|
| POSN | PLAYER | POSN | PLAYER |
| PK | ANDERSON, GARY, PITTSBURGH | TE | BAVERO, MARK, NEW YORK (G) |
| PK | BAHR, CHRIS, | S | DUERSON, DAVE, |
| QB | BLACKLEDGE, TODD, | RB | EDMONDS, BOBBY JOE, |
| RB | CRIBBS, JOE, | QB | EEVERTT, JIM, RAMS |
| CB | DAVIS, BRIAN, | DE | MACKLENBURG, KARL, |
| CB | GREEN, DARRELL, | WR | SMITH, J.T., |
| PK | IGWEBULK, DONALD, | QB | TOMOZAK, MIKE, |
| RB | KINNEBREW, LARRY, | WR | TURNER, DARVI, |
| LB | MARSHALL, WILBUR, | TE | WARREN, DON, |
| RB | MAYE, RUEBEN, | LB | WILLIAMS, REDDIE, |
| QB | MONTANA, JOE, | CB | WRIGHT, ERIC, |
| B | McELROY, VANN, | | |

= MOVE BAR    PGUP    PGDN    F1=DELETE STARTING PLAYERS    F10=SELECT NEXT FRANCHISE

FIG. 6d

FRANCHISE FOOTBALL LEAGUE
MAKE TRADES BETWEEN FRANCHISES
1988 SEASON

| FRAN: SIMPSON/PALMER/CURTIS | |
|---|---|
| POSN | PLAYER |
| PK | ANDERSON, GARY, PITTSBURGH |
| PK | BAHR, CHRIS, |
| QB | BLACKLEDGE, TODD, |
| RB | CRIBBS, JOE, |
| CB | DAVIS, BRIAN, |
| CB | GREEN, DARRELL, |
| PK | IGWEBULK, DONALD, |
| RB | KINNEBREW, LARRY, |
| LB | MARSHALL, WILBER, |
| RB | MAYES, REUBEN, |
| QB | MONTANA, JOE, |
| S | McELROY, VANN, |
| S | SHELL, DONNIE, |
| LB | SINGLETARY, MIKE, |
| WR | SLAUGHTER, WEBSTER, |

| FRAN: THE GREEK | |
|---|---|
| POSN | PLAYER |
| RB | ABERCROMBIE, WALT, PITTSBURGH |
| RB | ANDERSON, NEAL, |
| LB | BANKS, CARL, |
| FB | BYNER, EARNEST, |
| WR | GENTRY, DENNIS, |
| CB | GRAY, JERRY, |
| RB | JACKSON, EARNEST, |
| PK | JAEGER, JEFF, |
| QB | KEMP, JEFF, |
| LB | MILLEN, MATT, |
| RB | ROGERS, GEORGE, |
| WR | WATSON, STEVE, |
| QB | WILLIAMS, DOUG, |
| LB | YOUNG, FREDD, |
| LB | BOSWORTH, BRIAN, |

F1=EXECUTE TRADE   F2=REVERSE TRADE   F10=END TRADE

FIG. 7

FRANCHISE FOOTBALL LEAGUE
SUPPLEMENTAL DRAFT
1988 SEASON

| AVAILABLE NFL PLAYERS | | FRAN: THE GREEK | ROUND 5 SELECTION 2 |
|---|---|---|---|
| POSN | PLAYER | POSN | PLAYER |
| PK | ANDERSON, GARY, PITTSBURGH | RB | ABERCROMBIE, WALT, PITTSBURGH |
| PK | BAHR, CHRIS, | RB | ANDERSON, NEAL, |
| QB | BLACKLEDGE, TODD, | LB | BANKS, CARL, |
| RB | CRIBBS, JOE, | FB | BYNER, EARNEST, |
| CB | DAVIS, BRIAN, | WR | GENTRY, DENNIS, |
| CB | GREEN, DARRELL, | CB | GRAY, JERRY, |
| PK | IGWEBULK, DONALD, | RB | JACKSON, EARNEST, |
| RB | KINNEBREW, LARRY, | PK | JAEGER, JEFF, |
| LB | MARSHALL, WILBER, | QB | KEMP, JEFF, |
| RB | MAYES, REUBEN, | LB | MILLEN, MATT, |
| QB | MONTANA, JOE, | RB | ROGERS, GEORGE, |
| S | McELROY, VANN, | WR | WATSON, STEVE, |
| S | SHELL, DONNIE, | QB | WILLIAMS, DOUG, |
| LB | SINGLETARY, MIKE, | QB | YOUNG, FREDD, |
| WR | SLAUGHTER, WEBSTER, | LB | BOSWORTH, BRIAN, |

= MOVE BAR   PGUP   PGDN   FUNCTION KEYS

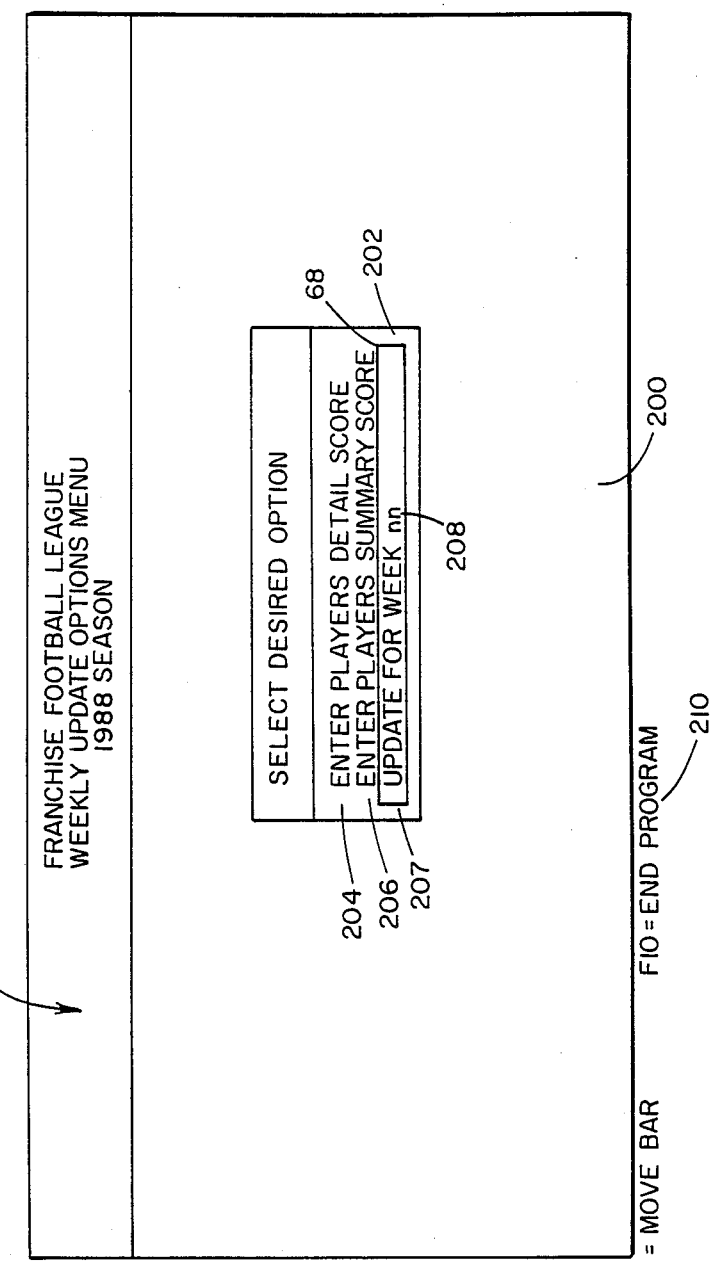

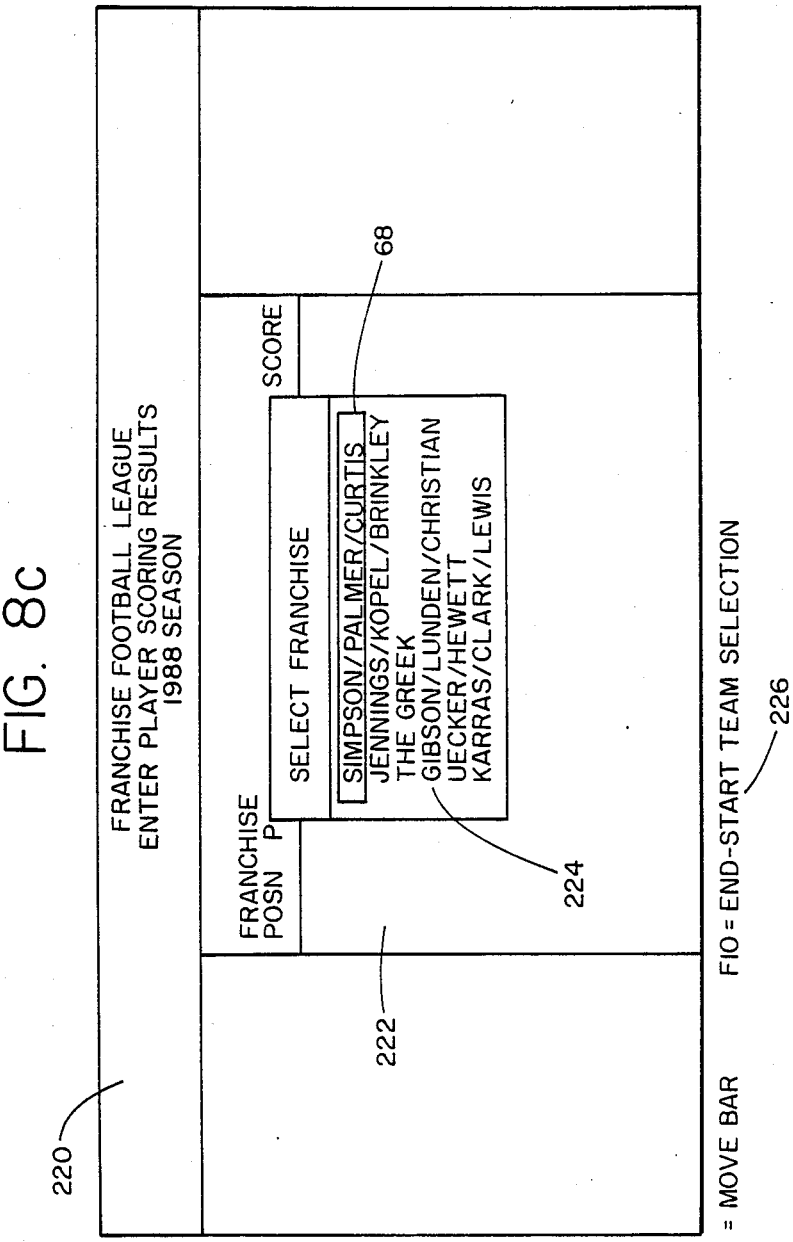

FIG. 8d

FRANCHISE FOOTBALL LEAGUE
ENTER PLAYER SCORING RESULTS
1988 SEASON

FRANCHISE : SIMPSON/PALMER/CURTIS — 232
POSN  PLAYER                          SCORE — 236

PK    ANDERSON, GARY, PITTSBURGH      25
PK    BAHR, CHRIS,                    41
QB    BLACKLEDGE, TODD,               12
RB    CRIBBS, JOE,                    18
CB    DAVIS, BRIAN,
CB    GREEN, DARRELL,
PK    IGWEBUIK, DONALD
RB    KINNEBREW, LARRY
LB    MARSHALL, WILBER
RB    MAYES, REUBEN,
QB    MONTANA, JOE,
S     McELROY, VANN,
S     SHELL, DONNIE,
LB    SINGLETARY, MIKE,
WR    SLAUGHTER, WEBSTER,

— 228
— 230
— 234
— 238

= MOVE BAR    F10 = END-START TEAM SELECTION

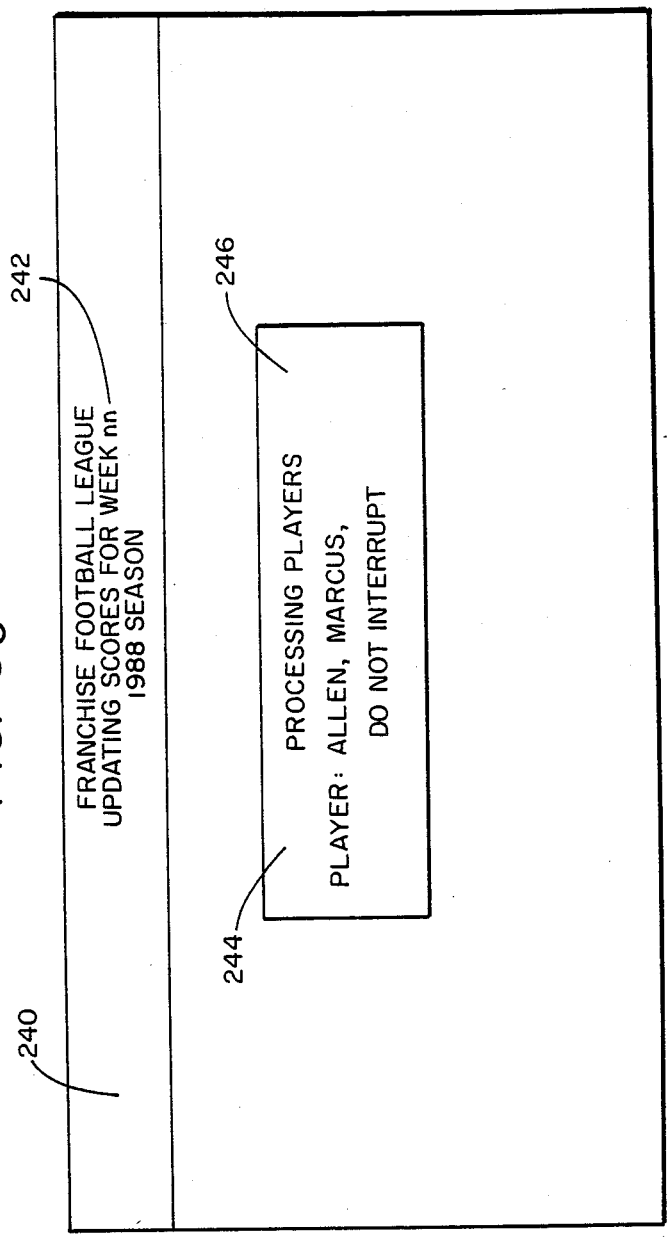

FIG. 10

FUNCTIONS

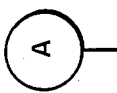

- 435 — UTILITY - ALL VARIABLES INITIALIZED, WINDOW DISPLAY FORMAT
- 440 — WINDOW UTILITY - FUNCTION CAN BE CALLED ANYWHERE FROM MAIN PROGRAM
- 445 — GET DISK - READ FUNCTION, READ INFORMATION/CODE OFF THE DISK
- 450 — PUT DISK - WRITE FUNCTION, WRITE INFORMATION
- 455 — GETSYS - OPENS ANY FILES, GETS FILE SIZE, ETC. ONCE YOU GET ALL YOUR VARIABLES
- 460 — FUNCTION - CONTROLS PROMPTING OF NAMES
- 465 — NEXTCMD - GIVES NEXT OPTION, WAITS ON WINDOW FOR THE NEXT KEY
- 470 — ASSIGN - FITS TYPED AREA INTO SCREEN, ASSIGNS TO THE ROW & COLUMN
- 475 — PROMPT - CONTROLS INTERACTION, CONTROLS BAR MOVEMENT/MOVES BAND WHAT ASSIGN SETS UP
- 480 — DISPLAY - DISPLAYS/PAINTS THE SCREEN
- 485 — INDEX (FABS) - VARIOUS INDEXES TO BE READ IN THE PROGRAM

FIG. 11

WINDOW FUNCTIONS

- 510 — INIT WINDOW - SETS UP WINDOW PARAMETERS
- 515 — DISPLAY WINDOW - DISPLAYS WINDOW ON SCREEN
- 520 — DELETE WINDOW - DELETES WINDOW AND DISPLAYS WHAT WAS UNDER IT
- 525 — PRINT BOX - PRINTS BOX ON SCREEN
- 530 — WIND BAR DOWN - MOVES WINDOW BAR DOWN ONE LINE
- 535 — PLACE WIND BAR - PLACES WINDOW BAR IN WINDOW
- 540 — DELETE WINDOW BAR - TAKES BAR OUT OF WINDOW
- 545 — DISPWIND - DISPLAYS DATA IN WINDOW
- 550 — READ WINDOW - DISPLAY LINE/READ WINDOW FILLS UP W/VARIABLES THAT ALLOW FOR FIRST OCCURRENCE IN THAT CHOSEN FILE FOR CHOSEN KEY
- 555 — WIND LINE DOWN - SCROLL WIND DOWN
- 560 — WIND LINE UP - SCROLL WIND UP
- 565 — INP WINDOW - ALLOWS DISPLAY OF OPTIONS IN A HEADING, PROMPTING WINDOW
- 570 — WIND MENU - GIVES THE OPTIONS

COMPUTERIZED STATISTICAL FOOTBALL GAME

TECHNICAL FIELD OF THE INVENTION

The present invention relates to a method of and apparatus for playing a football game based upon weekly live pro-football action. The invention provides for a system of setting up teams of actual NFL players and basing each team's successes upon the results of actual NFL games.

BACKGROUND OF THE INVENTION

The competition and excitement of professional football engenders a religious following amongst millions of fans. Fans score the performance of players and teams season after season. These fans frequently organize formal and informal pools to capitalize on their own knowledge of the game and their desire to compete with other fans. As a result of this keen interest, numerous football games have been devised to mimic various aspects of professional football. However, none of these games combine the reality of actual football action with the ease and simplicity of computer graphics.

One of the more sophisticated professional football games is Fantasy Football by Allpro Publishing Company, Van Nuys, California. This game is played in conjunction with the information reported in Fantasy Football Magazine. Each Fantasy Football team is set up using actual NFL players. The game is based upon a point system of the actual offensive performance of various NFL players where each Fantasy Football team receives points for their players performances. All lineups and head-to-head games are decided by a Commissioner who also must mail weekly copies of the league's standings along with any other roster changes to the team members. It is also the responsibility of each Commissioner to collect money and account for wins and losses of the point money for each team. The Fantasy Football game thereby requires that the Commissioner perform all of the mailings, calculate all of the scores and manually administer the drafting of players.

Another popular football game is Strat-O-Matic football. Unlike the Fantasy Football League's use of the actual NFL performances, the Strat-O-Matic game uses cards, dice and a game board to determine wins/losses. To play Strat-O-Matic, a defensive team guesses the opposing team's offensive play. If the guess is wrong, the points accorded each team are based upon what the dice show multiplied by the winning offensive/defensive strategy. The Strat-O-Matic game thereby lacks the realism of actual NFL scores by relying more on the luck of the dice than the player's knowledge of the game.

Another board game, known as Pro Football Franchise, is a trading game where game players buy, sell and trade team members in order to construct the best possible starting roster. However, the Pro Football Franchise does not include an option for playing actual football.

Several computerized football games also are available. One game called TGIFG allows up to 32 individual players to pit themselves against a programmed computer and other players in determining the rank of the 14 weekly games throughout the entire season. However, TGIFG does not base wins/losses on actual NFL games.

Another computer game is the MSFL Pro Football League. The MSFL game is a computerized prediction service based upon each team's weaknesses and strengths. Wins for games are determined by an automated analysis of these factors. However, the MSFL is more of a component to be used in conjunction with actual NFL games than as a computerized football game to be played as a substitute.

The various available games, therefore, do not provide for an easy to use football game that is based upon the actual performances of live football action. Moreover, those games that do incorporate the results of live weekly action require a substantial personal effort in order to make the game work.

SUMMARY AND OBJECTS OF THE INVENTION

In view of the foregoing, it should be apparent that there exists a need in the art for an apparatus of and method for automatically selecting play football teams comprised of actual professional football players and having the teams compete based upon the player's actual football scores. This object is achieved through a computer program adapted to provide users of the game with football statistical data without a substantial effort on the part of the users or organizers of the game.

More particularly, it is an object of the invention to provide for a football game for setting up league franchises whereby the owners of each of the franchises correspond to one or more users of the game.

Still more particularly, it is an object of this invention to provide for a football game having a player draft capability based upon the names, positions and cities of up to 600 actual football players.

Another object of the present invention is to provide for a player draft whereby players are drafted in a series of rounds by each team in a league. Players selected in the rounds are automatically added to the overall number of available players for each franchise.

A further object of the present invention is to provide for a starting roster based upon the previous week's rosters. Information regarding player injuries, suspensions and errors (e.g., fumbles) is used to determine who makes up the starting roster.

It is yet a further object of the present invention to provide for a computerized football game where individual players are traded between any two franchises.

It is still another object of the invention to automatically update individual player's scores each week. A team's score is then calculated based upon the individual scores. Once these totals are determined, a competing teams' total scores can be used to determine the successes and losses throughout the entire season.

Briefly described, these and other objects of the invention are accomplished in accordance with an apparatus for playing football by providing a computer program which enables an individual player to set up a league. The league consists of up to 12 franchises which are owned by individual or several users of the game. Once the league franchises are determined, the players are drafted based upon an actual list of 600 available NFL players. The draft proceeds in the order of the franchises.

Following the completion of the draft, starting players are selected by individual franchises for the weekly starting rosters. In addition, the computerized football game allows franchise owners to make trades of individual players throughout the season. The scoring for each team is based upon two methods. The first involves automatically calculating a team's score from individual players' scores. The automated scoring system uses updated score information provided on a weekly basis in the form of diskettes. When each diskette is loaded into a computer, information about each player is automatically updated and a total number of points per player is assigned to the franchises having those players as their team members. A score for the franchise for that given week is then tabulated. The second method involves using the diskette's information as a basis for manually calculating individual players performance. The computer then tabulates a total score for the team from the individual scores.

These and other objects of the invention are accomplished in accordance with a method for playing computerized football. The method consists of first setting up individual franchises and then drafting players for those franchises. Once the franchises are drafted, players can be traded between the different franchises. Following the trades, the franchise owners can select their starting team for each week's play. The play is based upon points achieved by individual players, the total of which creates a franchise score for a given week. Thus, wins and losses for each franchise are based upon actual performances by the drafted NFL team members.

BRIEF DESCRIPTION OF THE DRAWINGS

FIG. 2 is a diagram of the window of the MAIN MENU program shown in FIG. 1;

FIG. 3 illustrates the window display of the SET UP LEAGUE FRANCHISES program shown in FIG. 1;

FIGS. 4a–4e illustrate the window displays of the DRAFT NIGHT program in FIG. 1;

FIGS. 5a–5b illustrate the window display of the SELECT STARTING PLAYERS program in FIG. 1;

FIGS. 6a–6d illustrate the window displays of the MAKE TRADES program shown in FIG. 1;

FIG. 7 shows the window display of the SUPPLEMENTAL DRAFT program illustrated in FIG. 1;

FIGS. 8a–8e illustrate the flow chart and window displays for the UPDATE WEEKLY SCORING program shown in FIG. 1;

FIG. 10 is a block diagram of the subroutines used in the program of FIG. 1; and FIG. 11 is a block diagram of the various functions that make up the window utilities of the program shown in FIG. 1.

DETAILED DESCRIPTION OF THE PREFERRED EMBODIMENT

Figure 1:
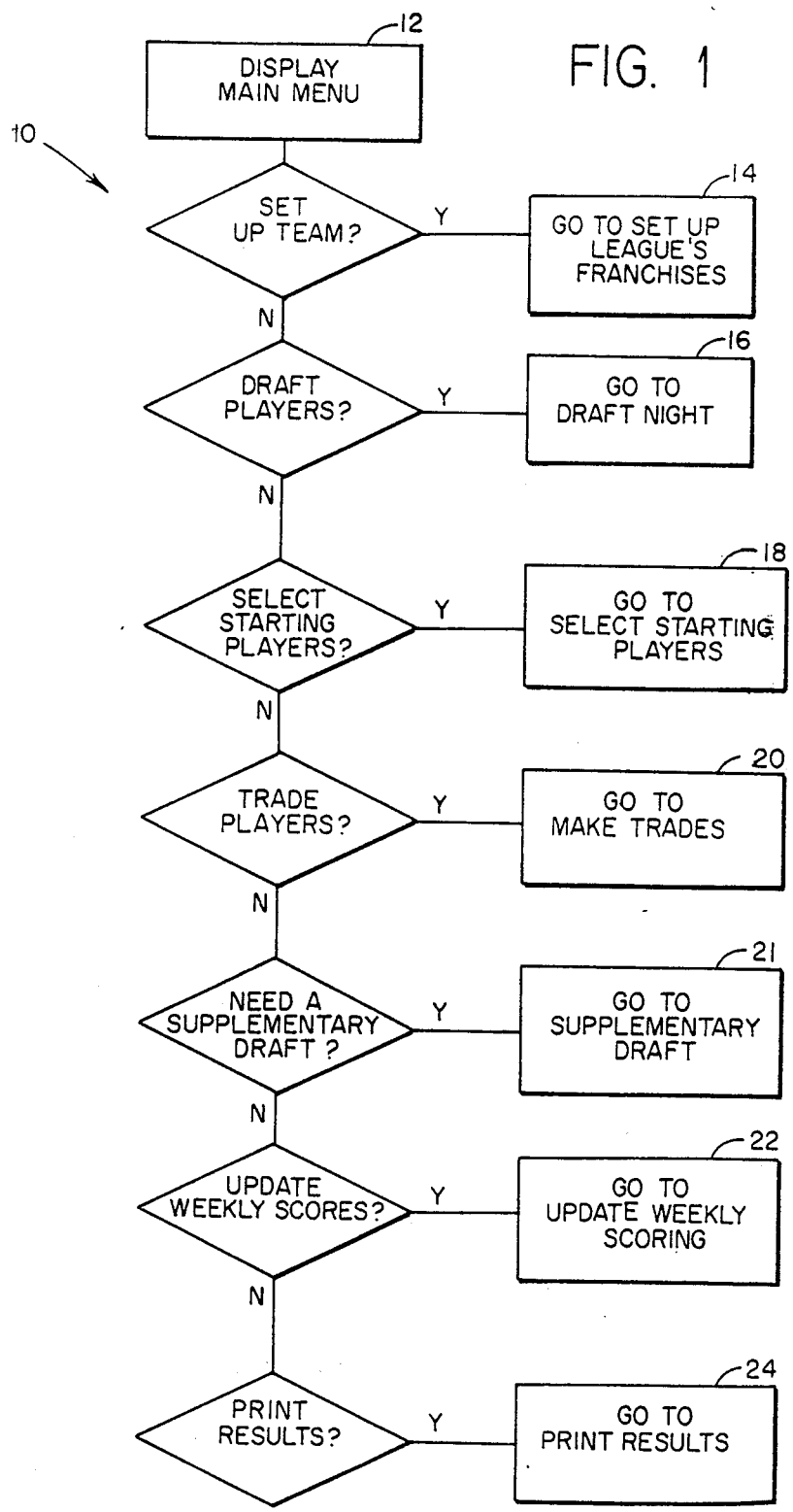
FIG. 1 is a flow chart of the program forming the present invention.

Referring to the drawings wherein like parts are referenced by like reference numerals, FIG. 1 shows a flow chart of the computerized game 10. Although the description of the present invention is directed to a football game, it is contemplated that the present invention can be used in combination with any other team sport.

The football game 10 consists of a main program 12 where the player can choose up to seven individual subprograms 14, 16, 18, 20, 21, 22 and 24 for playing the game. The subprograms perform the tasks for setting up individual franchises 14, organizing an NFL draft using a 600-player NFL roster 16 and 21, charting weekly starting line-ups for each of the franchises 18, executing trades 20, tabulating a player's and team's scores in order to determine weekly and seasonal champions 22 and printing out the score results 24. Before describing each function, however, it is important to understand how the game is played.

A. The Computerized Football Game

The players of computerized football game organize themselves into leagues. Each league can have from one to twelve franchises. In order to accommodate leagues containing more than twelve players, one or more of the franchises must have co-owners. In addition, each league must elect a Commissioner.

The Commissioner also acts as a franchise owner, but he/she has the additional responsibilities of coordinating and charting the roster line-ups for each franchise. The Commissioner is the only player who needs to have access to the computer.

In order to play the computerized football game, a Commissioner may use either an IBM XT, AT or other IBM compatible computer. The computer includes a monitor (either monochrome or color). The computer memory consists of either two 5 ¼ inch floppy disk drives or one hard disk and one 5 ¼ inch floppy disk drive. The computer also has 512 Kbytes of RAM-type memory. The computer also includes a printer.

Before playing the game, the Commissioner is provided with two programmed diskettes which together contain a list of the 600 NFL players to be used in the football game draft. Players also receive an official rule book for the game.

Normally, information about the individual players scores is received by each Commissioner on a weekly basis. This information is loaded into the program and individualized in accordance with the scoring rules of each league. Use of the various functions of the football game can vary in accordance with the wishes of a purchaser. Hence, the use of each function can be varied in frequency.

In order to operate the program, the Commissioner must simply follow the basic instructions that appear at the bottom of the computer screen or are described in the rule book. To make a selection of the offered menu options, the Commissioner need only move a prompt bar by using the arrow keys on the keyboard. Once the prompt bar overlies a desired selection, the Commissioner then presses the ENTER key causing the computer to receive an appropriate instruction. The program is ended by pressing the option key "F10" which completes the selected function.

Referring again to FIG. 1, the six functions selected from the main menu can be chosen in any desired order. Preferably, the DRAFT NIGHT 16 and SET-UP LEAGUE'S FRANCHISES 14 occur at the beginning of the NFL season. The SELECT STARTING PLAYERS and UPDATE WEEKLY SCORING function 18 is normally updated on a weekly basis throughout the season. The MAKE TRADES program 20 can be selected at any time during the regular season.

B. The MAIN MENU Program

Referring now to FIG. 2, the screen display for the MAIN MENU 12 is shown. The MAIN MENU 12 includes the option menu 27 which lists each of the seven sub-programs 14, 16, 18, 20, 21, 22 and 24. Selection of each of the subprograms occurs through movement of a prompt bar 28 up or down the option menu 27. Once the prompt bar 26 overlays the desired subprogram 23, the operator then presses the ENTER or START key (depending upon the type of keyboard) and the selected function is subsequently activated. The seven functions are thereby alternately selectable from the MAIN MENU and do not require sequencing through the subprograms in any particular order or combination.

Although not illustrated, the prompt bar 26 is constructed such that it will change the color of the selection that it overlies. Should no selections be desired, the user can end the program by pressing the "F10" key as shown by screen prompt 29.

C. THE SETTING UP LEAGUE FRANCHISES Program

FIG. 3 illustrates the display and menu used in setting up the league's franchises. To play, each user of computerized football chooses a name for his/her franchise. The limit to the number of franchises may be set at twelve, so if there are more than twelve players in a league, two or more players may own the same franchise. Once a franchise owner is designated or a team name is chosen, the Commissioner types the franchise name into the menu 31.

Each franchise name is listed in two columns 30a and 30b and can be designated in any way. As shown, for example, in FIG. 3, the franchise names are chosen based upon the actual names of the game players 40. Entry of the names is accomplished by moving prompt bar 33 to an available entry. The Commissioner then types in the name(s) of the franchises and presses the ENTER key.

The SET UP LEAGUE'S FRANCHISES include several additional options. Two options are listed below in menus 31 and 32. The first of these two options "Finished Making Changes To Teams" 34 causes the changed franchise names to be executed. Should changes to the names of teams be desired, the "Make More Changes to Teams" option 36 can be enabled. A choice of either function 34 or 36 is accomplished by moving prompt bar 33 down across the options menu 32 and pressing the ENTER key. Once the user has completed setting up the franchises, the "F10" key 38 can be actuated to return to the MAIN MENU 12.

The computerized football league can be played with any number of teams as long as there are a minimum of two. Accordingly, all of the software will work regardless of the number of teams entered into menu 31.

1. The Draft Night Menus

Figures 4A, 4C:
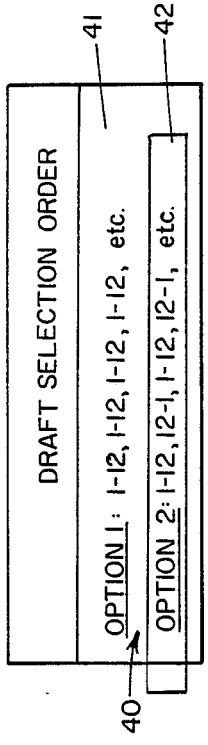

FIGS. 4a–4e each illustrate the progression of menus included in playing the DRAFT NIGHT function 16. Once the teams are set up in the SET UP LEAGUE'S FRANCHISES program 14 the Commissioner moves re-prompt bar 23 down to the DRAFT NIGHT entry and presses the ENTER key. Upon making this selection, a draft selection order window 40, as shown in FIG. 4a, immediately appears on the Commissioner's display.

More particularly, the window 41 of FIG. 4a provides the user with two choices for the selection order of the draft. The first option allows the franchise owners to select their players in the same order as the franchises. Thus, franchise one has selection one continuing through to franchise twelve which has selection twelve. Each round repeats the same process beginning with franchise one and ending with franchise twelve until all the picks have been chosen.

The second option 42 begins in the first round with a pick by franchise one and continues through to franchise twelve. The second round is then reversed so that franchise twelve gets the first pick. The selection process then continues backward to franchise one. The third round begins with a pick by franchise one and continues through franchise twelve. The fourth round is again reversed, beginning with franchise twelve and so on until all of the selections are made. Upon choosing which selection order to use for a draft selection, menu 50 illustrated FIG. 4b appears.

The menu 50 of FIG. 4b consists of two windows 52 and 54 respectively. Window 52 lists the available players for the draft. Window 54 shows the players list of the team with the current pick. Each window contains a list of players 56 and 62. The players are initially listed in alphabetical order. Adjacent to the players' names is their position 57 and 64 and the actual city 59 and 65 that they play for.

The information presented at the top of each window differs. Window 54 indicates the round 60 for the current DRAFT NIGHT selection. The top portion of the window also lists the name of the franchise 66 presently making the selection.

The DRAFT NIGHT window also includes several optional functions. The "PG-UP" and "PG-DN" functions 70 and 72 respectively control movement of the information in windows 52 and 54. When the "PG-UP" function is selected, information above that shown on the screen scrolls down into the user's field of view. Thus, players names located above "Keith Byars"and "Gary Anderson" (as shown in FIG. 4b) become available to the operator. The "PG-DN" option operates in the opposite manner by scrolling those names located below "Ernest Gibbons" and "Hanford Dixon" (as shown in FIG. 4b) into the window. The "Change Order" 74 "Go To Player" 75, "Team Window" 76, "Display Drafted Players" 78, "Other Options" 79 and "End Draft" 73 functions are further described below.

Function key F1 "Change Order" 74 changes the order in which the players are displayed. Players can be displayed alphabetically by position or by NFL team. The default of the DRAFT NIGHT program is to display the players in alphabetical order as shown in columns 56 and 62 of FIG. 4b.

When the function key F1 74 is depressed, the window shown in FIG. 4c appears. More particularly, the window includes columns 80 and 81 which are identical to those columns that appear prior to pressing the F1 function key 74. However, a window 82 appears in the center of the screen which provides the user with two choices 83 and 84. The first choice 83 enables the operator to display players by position. Thus, upon moving prompt bar 68 to choice 83 and pressing the ENTER key, all of the players in windows 80 and 81 are reordered by position. Alternatively, when the prompt bar 68 is placed over "Display By NFL City function" 84, the list is reordered in the alphabetical order of NFL cities. In order to return to the player window 50, the user must press function key "F1" 74.

The Function key "F2" 75 quickly locates a specific player or player position. To access this option, the user presses the "F2" key whereupon window 90 shown in FIG. 4d appears. The window 90 is identical to window 50 shown in FIG. 4b. In addition, an inner window 92 appears on the screen to help the user locate a specific player. The Commissioner then types the player's name or part of his name into the window 92 and presses the ENTER key. The prompt bar 68 will move along the appropriate list where it highlights the selected player's name. In the case where a single player has two positions, the prompt bar 68 will move to the first position, stop for a pre-determined period of time and then move to the second position.

To locate a player by position, the user types the abbreviation for the desired position ("QB" for Quarterback, "RB" for Running Back, "PR" for Pass Receiver, "K" for Kicker, "ST" for Special Team's Player, "LB" for Linebacker and "DB" for Defensive Back). The user then presses the ENTER key and the prompt bar 68 highlights the group of positions in the left window 93. To return to the player window screen 50 (FIG. 4b), the user then presses the function key "F2" 75.

The function key "F3" 76 of FIG. 4b moves the prompt bar 68 from the available NFL players' window 52 to the franchise window 54. The list of players in the franchise window 54 can then be displayed alphabetically or by position. To do so, the user presses the function key "F1" 74 to access the change of order function. To return to the player's window 52, the user then presses key "F2" 75.

Figure 4E:
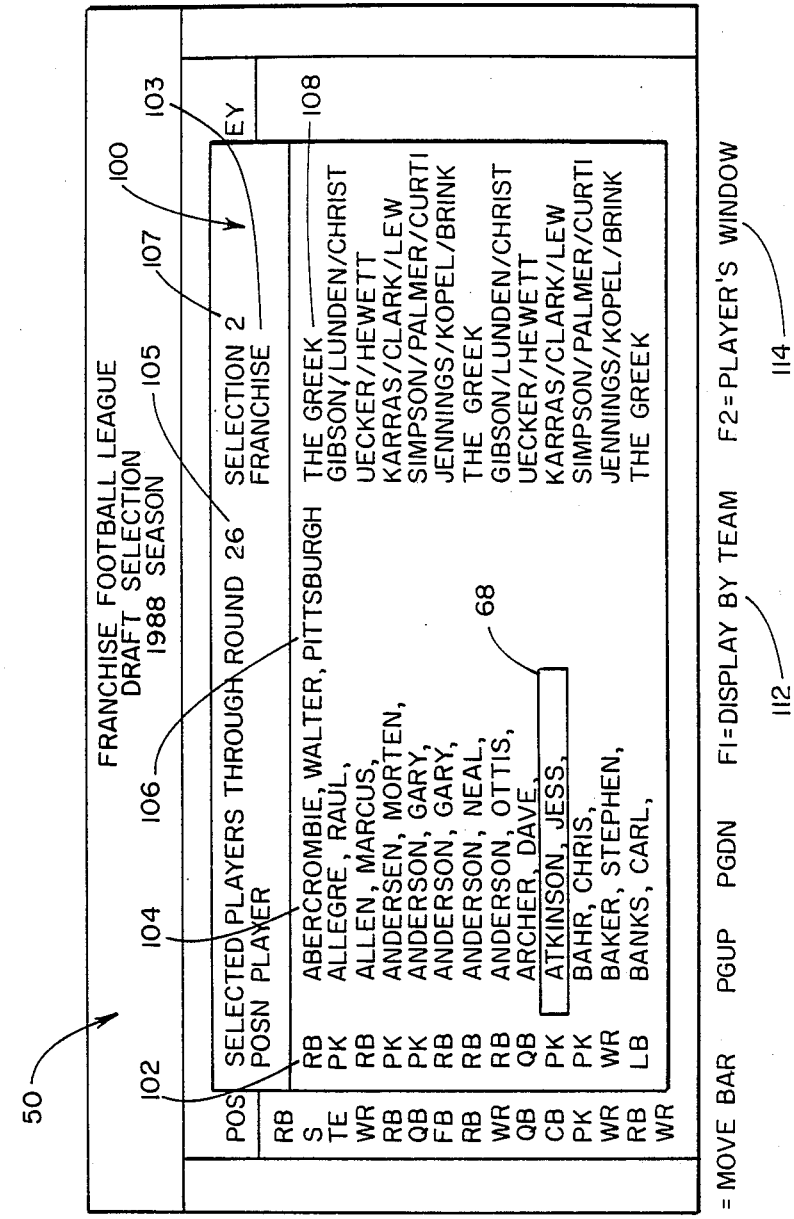

The function key "F4" 77, as shown in FIG. 4b, lists all of the NFL Players that have been drafted up to the current round. More particularly, upon depressing the F4 key, a window 100 appears as shown in FIG. 4e. The window 100 lists players alphabetically 104 indicating their position 102, the player's actual NFL city 106 and the franchise from which they were selected 108. Window 100 also displays the last round 105 and selection number 107 made during the draft. The franchise name 103 having current selection is indicated at the top of the window. The name of the franchise 108 which drafted each listed player is located inside window 100.

The players are listed alphabetically 104 or by position or franchise owner. Ordering of the player list is accomplished by pressing the "Display By Team" option 112. The window option 114 returns the prompt bar 68 to the available NFL player's window 50 shown in FIG. 4b.

The functions "Other Options" 76 and "End Draft" 77 (of FIG. 4b) respectively provide the user with a help screen and an exit from the DRAFT NIGHT program. Upon actuating the key 79, a menu listing the available functions ("F1-F4 and F9-F10") appears on the screen (not shown). Actuation of the "F4" key 77 will cause a window to appear (not shown) stating that the draft is officially over and prompting the user whether they wish to print out the weekly starting selection sheet. If the printer is accessible and ready to print, the user presses the "YES" Option (not shown). The user also can print out the selection sheets at another time by selecting the PRINT-OUT WEEKLY RESULTS program 24 as shown in FIG. 1.

2. How to Play Draft Night

DRAFT NIGHT can be played in a variety of different ways. The following description is an example of one way the program is used.

The DRAFT NIGHT rounds are organized like an actual NFL draft. The computerized football program diskettes will first be provided to the Commissioner listing the top 600 available NFL players. Each Commissioner will receive the players' diskette after a final 49 player limit is announced. Normally, the announcement follows the third week of the actual pre-season games. The 600 player diskette forms the data base for all of the draft information.

There are 25 rounds in the initial DRAFT NIGHT. In addition, a five round SUPPLEMENTAL DRAFT 21 is held later in the season. The maximum number of rounds for the season is 30.

If the computer football game is to be played for the entire NFL season, the DRAFT NIGHT program 16 should e played the week of August 28th since the first NFL season game is September 4th. The five round SUPPLEMENTAL DRAFT program 21 (see FIG. 7) should be held after Week 4 and before Week 5 of the regular NFL season. If the league is playing for only part of the NFL season, both drafts may be combined or they may, in turn, be held separately.

The diskettes are set-up so that each franchise drafts 25 NFL players. Obviously, if fewer than 12 franchises form a league, then each team selects additional players. Based upon the maximum number of teams, each franchise has the following player choices:

3 Quarterbacks (QB)
  5 Running Backs (RB)
  6 Pass Receivers (PR)
  2 Kickers (K)
  2 Special Teams Players (ST)
  3 Linebackers (LB)
  4 Defensive Backs (DB)°

Five additional players are added to each team in the SUPPLEMENTAL DRAFT 21. Players in the SUPPLEMENTAL DRAFT program can be picked from any of the seven player categories.

To play, each franchise must first draft the required number of players at each position. Choice of positions, however, do not have to be made in any particular order. Obviously, successful franchises will attempt to pick the most eligible high scoring NFL player that is available at the time of the franchise owner's selection.

In several circumstances, NFL players are listed at two positions in the supplied diskette. In those instances, the player may be picked twice by the franchises. Thus, an NFL defensive back may also be listed as a special team's player. One franchise may select the defensive back and another franchise may select the same player to the special team.

When all franchises are present and ready to start DRAFT NIGHT, the Commissioner will begin by placing the prompt bar 68 on the first selected chosen player in window 52. When the draft begins, the left screen 52 will contain all 600 available NFL players. The franchise window 54, on the other hand, is blank. At this stage, the window 54 only shows that this is the first selection for round one and that is the franchise which has the first selection.

Round one starts with the first franchise having the first pick. The Commissioner can place a time limit on each franchise's draft selection. Once the first franchise picks the player that it wants to draft, the Commissioner (or Franchise Owner) scrolls through the list of players 56, using a "PG-UP" Command 70 or "PG-DN" Command 72. The prompt bar 68 is then placed over the name of the desired player and the Commissioner then presses the ENTER key. The selection eliminates the chosen player's name from the window 52 and places it in window 54. Once moved, the window menu 50 enters another mode where two new functions are provided at the bottom of the window (not shown).

The two additional functions are: "F1-Execute Pick" and "F2-Reverse Pick". More particularly, function key F1 executes the previously entered draft selection. When this key is pressed, the order of functions returns to that shown in FIG. 4b and the selected player's name appears in the selected player's window 54.

Function key F2 can be selected to reverse the pick. For example, if the franchise owner selects the wrong player or wants to change his pick, he must use "F2" function. Actuation of the "F2" key automatically moves the selected player's name from the right window 54 back to the available NFL player window 52. A different player can then be picked by repeating the above process and executing the pick by pressing the function key F1.

E. The SELECT THE STARTING PLAYERS program

1. The SELECT STARTING PLAYERS Menus

Figure 5A:
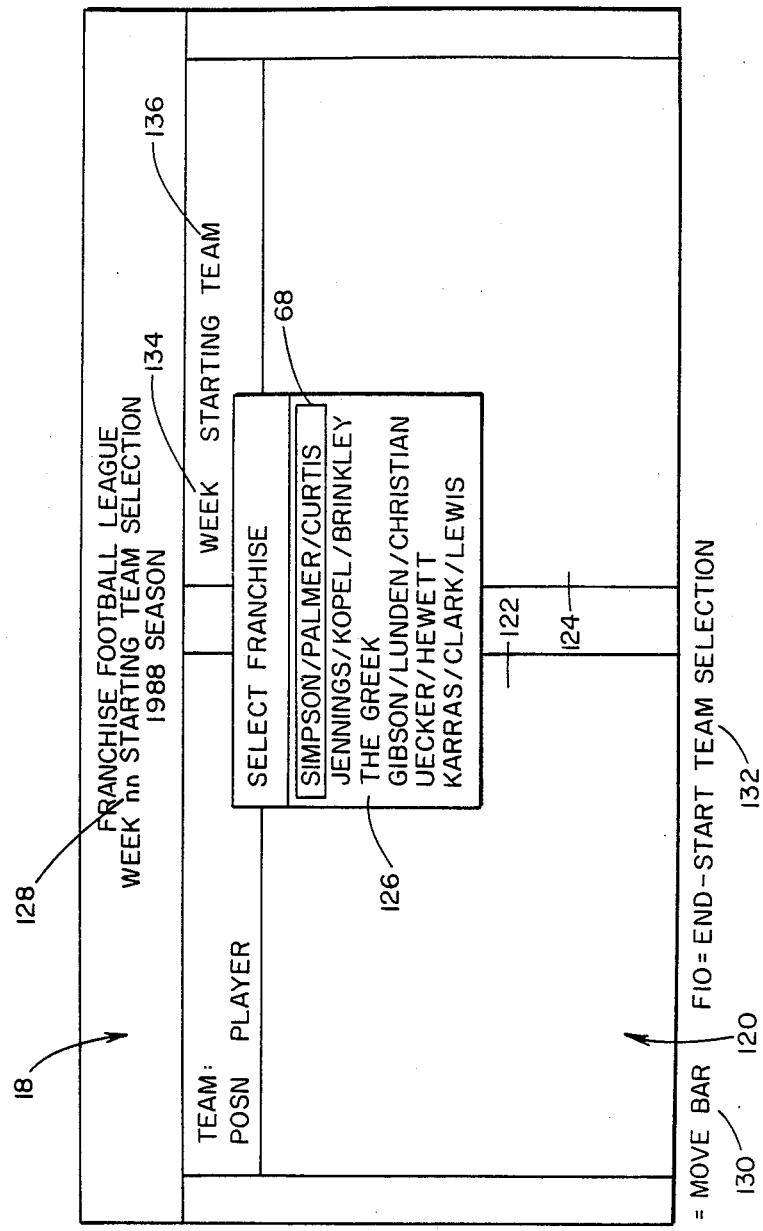

FIGS. 5a and 5b illustrate the SELECT STARTING PLAYERS program 18. As previously described and as shown in FIG. 2, this program is initiated in the MAIN MENU when the user moves the prompt bar 26 down to program 18 and presses the ENTER key. Once entered, a weekly starting players screen 120 appears (FIG. 5a).

The screen 120, as shown in FIG. 5a, consists of two main windows 122 and 124. Window 122 lists the team in a similar manner to that of window 50 of FIG. 4b (i.e., by position, player and NFL team's city.) The players listed in left window 122 are the available players not yet selected to be part of the starting NFL team. Window 124 lists those players selected in the previous week's game. They are listed in a manner identical to screen 122, (e.g., by position, player name and NFL city.) Moreover, the screen 120 indicates which week 128 the starting team selection is to be made for. The week 128 is changed every time the Commissioner and franchise owners get together to make roster adjustments. The week is also repeated at 134 in the window 124.

2. Playing the SELECT STARTING PLAYER program

The program is, for example, accessed each week by the franchise owner. The franchise owner starts 11 of the 25 selected players on his/her roster (30 players after the SUPPLEMENTAL DRAFT). No substitutions or benchings of the players is normally allowed until that week's NFL games are concluded (after the Monday night football game). The football game may include starting line-up worksheets for each of the franchise owners with each of the weekly print-out packages. The packages contain weekly updated NFL players statistics to help the franchise owners decide who to start in that particular week's games. Any other arrangement can be used instead of the worksheet system.

The game is played by having franchise owners call up the Commissioner prior to kick-off time of the fist scheduled NFL game of each week (usually by 1:00 p.m., Eastern Standard/Eastern Daylight Time). All line-up changes by the franchise owners must be confirmed by the Commissioner before the kick-off time or the starting line-up remains the same as in the previous week.

The starting line-up is normally made up of the following positions:
1 Quarterback (QB)
2 Running Backs (RB)
3 Pass Receivers (PR)
1 Kicker (K)
1 Special Team's Players (ST)
1 Linebacker (LB)
2 Defensive Backs (DB)

When calls are placed from each of the franchise owners to the Commissioner with the selected starting line-ups, the Commissioner is then responsible for recording those line-ups into the program. To record the changes, the Commissioner begins by choosing the franchise to which he must make the initial changes.

The select franchise menu 126 is presented at this step. As described previously, all the Commissioner must do is move prompt bar 68 to the desired franchise team. Upon depressing the ENTER key, the available players and previously selected players will be displayed.

Upon selection of the franchise as shown in FIG. 5a, the starting teams and available player rosters are filled in windows 142 and 144 (as shown in FIG. 5b). The available player's window 142 lists players by their position 146, their name 148 and by the NFL city 150 they are associated with.

To select a starting player for a franchise, the Commissioner then places the prompt bar 68 on the desired player in the left window and presses the ENTER key. This automatically moves that player's name from the available player's window 142 and places the name in the starter's window 144. Selection of the eleven starting players is then made for the franchise. Should the franchise wish to have players removed from the starting player's list, the Commissioner merely needs to place the prompt bar 68 in the right window 144 and press the "F1" function key 156 to delete the starting players. The starting team player's name is then removed from the right window 144 and placed in the left window 142.

When the starting team make-up selection is complete for the first franchise, the Commissioner depresses function "F10" to select the next franchise 158.

When the starting line-ups of each of the franchises are concluded, the Commissioner will return to the franchise selection menu where he will then depress the function key "F10" 132 (see FIG. 5a) and return to the MAIN MENU 12.

F. The MAKE TRADES Program

FIGS. 6a through 6d illustrate the windows that make up the MAKE TRADES program 20.

Figure 6A:
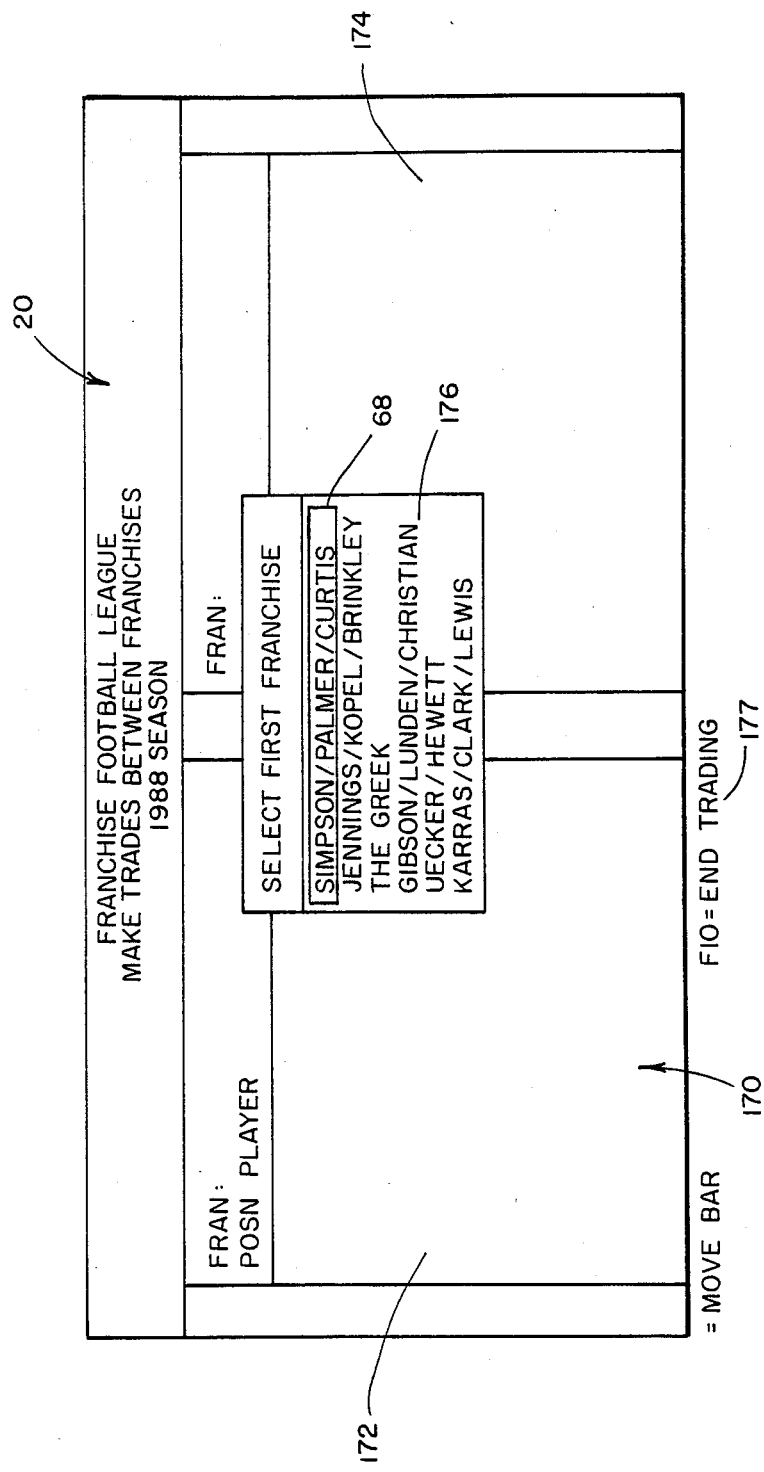

As in real NFL teams, the MAKE TRADE program allows franchise owners to trade players from one franchise to another. All trades are called into the Commissioner who then records the trades on the computer football program diskette. To do so, the Commissioner loads the computerized football program diskette into his PC and chooses the MAKE TRADES Option 20 from the MAIN MENU 12 (see FIG. 1). Upon selection, a window 170 as shown in FIG. 6a appears. The window consists of a left window 172 and a right window 174. The window 170 includes an inner window 176 which lists all of the league's franchises 173.

Figure 6B:
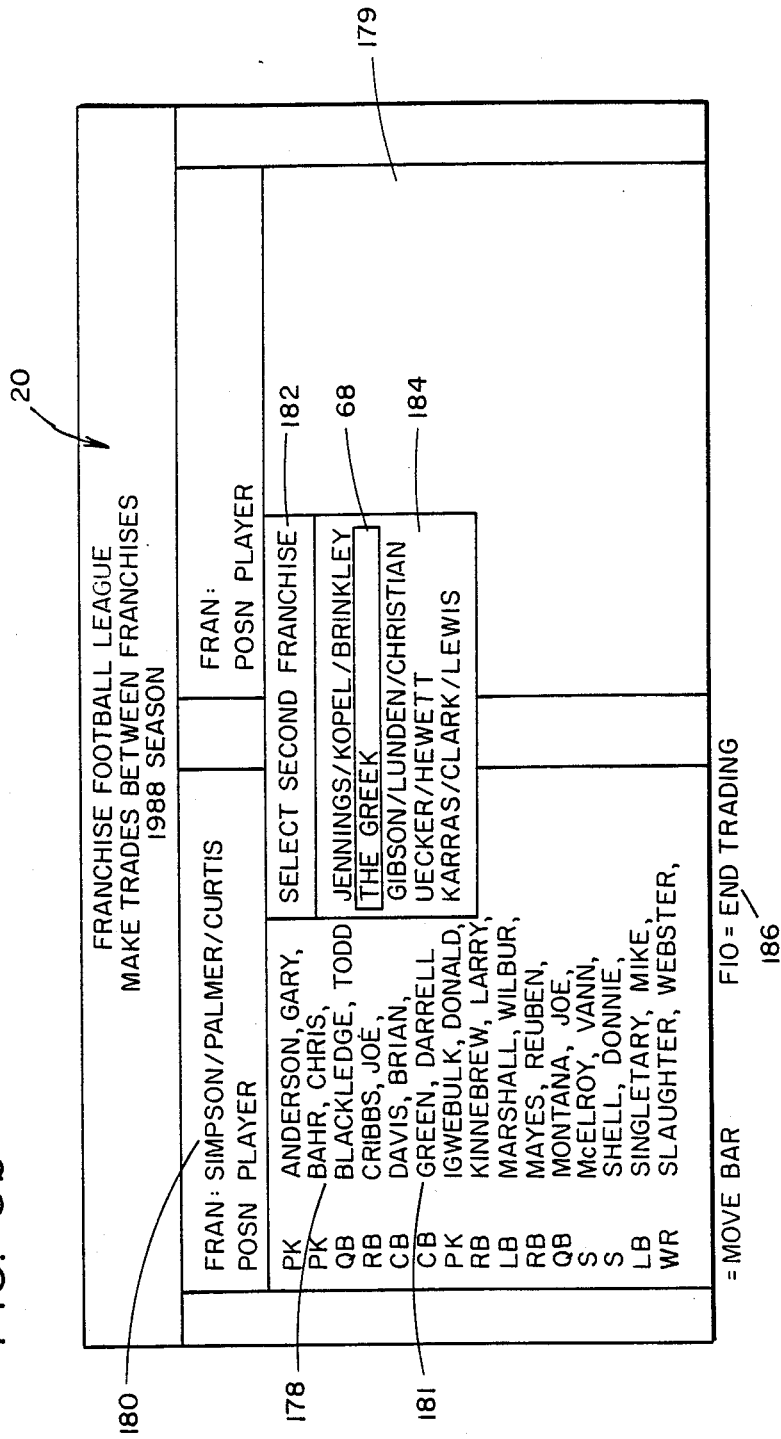

In operation, the Commissioner selects the first franchise from which the trades must be made. The Commissioner accomplishes this by moving the prompt bar 68 to the first trading team and by pressing the ENTER key. Two windows 178 and 179 then appear as shown in FIG. 6b. The left window 178 displays all players 181 from the selected franchise 180. The right window 179 displays all players from the second chosen franchise.

In order to select the next franchise, the Commissioner moves prompt bar 68 to inner window 184 and places the bar over the desired franchise 183. Upon pressing the ENTER Key, two complete windows appear as shown in FIG. 6c.

Figure 6C:
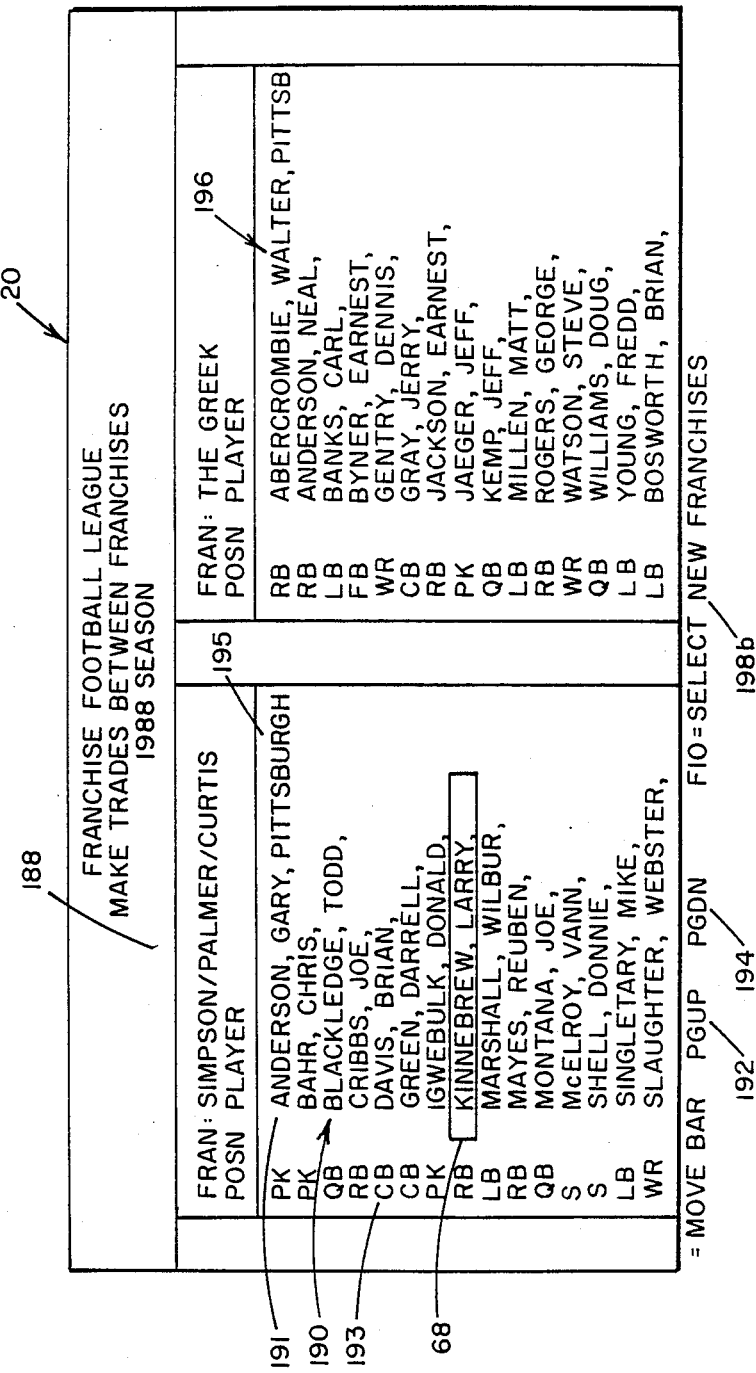

These two windows 190 and 196 of FIG. 6c respectively list the players 191, the player's positions 193 and the NFL cities 195 that the players represent. In order to view all of the players of each franchise, the Commissioner operates the "PG-UP" or "PG-DN" keys 192 and 194 as previously described. To trade the players, the prompt bar 68 is moved until it overlays the selected player. The Commissioner then presses the ENTER Key and the name is automatically deleted from the left window 180 and inserted into the right window 196. The trade window display 188 then goes into a second mode where two additional function keys "F1" and "F2" are presented.

The first function key "F1" 197, shown in FIG. 6d, is used to execute the trade selection after a player has been moved from one franchise to the next. Function Key "F2" 199 is used to reverse the trade back; moving the player back from window 196 to window 190. When the trade is complete, the Commissioner then presses key "F10" 198a which returns the Commissioner to the display shown in FIG. 6c. At that point, either a new team can be selected or the trading can end by actuation of key 198b (FIG. 6c). The Commissioner then returns to the MAIN MENU 12 by pressing key "F10" 177 shown in FIG. 6a.

G. The SUPPLEMENTAL DRAFT Program

After the initial draft and trades have been completed, a five round SUPPLEMENTAL DRAFT may be held. Normally this draft occurs after week 4 and before week 5 of the regular NFL season. If the league is not going to play the entire NFL season, then the DRAFT NIGHT and the SUPPLEMENTAL DRAFT can be held together.

The SUPPLEMENTAL DRAFT program is shown in FIG. 7. The SUPPLEMENTAL DRAFT is chosen by selecting option 21 from the MAIN MENU 12 (FIG. 2). A screen 300 appears, the format of which is identical to that of the DRAFT NIGHT program illustrated in FIGS. 4a–4e. The SUPPLEMENTAL DRAFT window 300 includes a left window 302 and a right window 304 which respectively display the available NFL Players 306 and the selected players 308. Each window indicates the player positions 310 and the player's NFL city 312. To make a draft choice, the Commissioner operates the prompt bar 68 in the same manner described in FIGS. 4a–4e.

Briefly, the prompt bar 68 is moved to the player to be traded. Upon pressing an ENTER key, the available NFL player is moved from the left window 302 to the right window 304 where his name is added to the player's list 308. The "PG-UP", "PG-DOWN" keys and function keys "F1", "F2", "F3", "F4", "F9", and "F10" operate identically to the function keys described above with regard to FIGS. 4a–4e.

H. The UPDATE WEEKLY SCORING Program

1. The Menus for UPDATE WEEKLY SCORING program

FIGS. 8a–8d illustrate the UPDATE WEEKLY SCORING program 22. The computerized football game allows leagues to use a unique scoring system that automatically tabulates a team's scores based upon the individual player's performance during actual NFL games. Alternatively, determination of an individual's performance can be accomplished by the league's own scoring system.

Figure 8A:
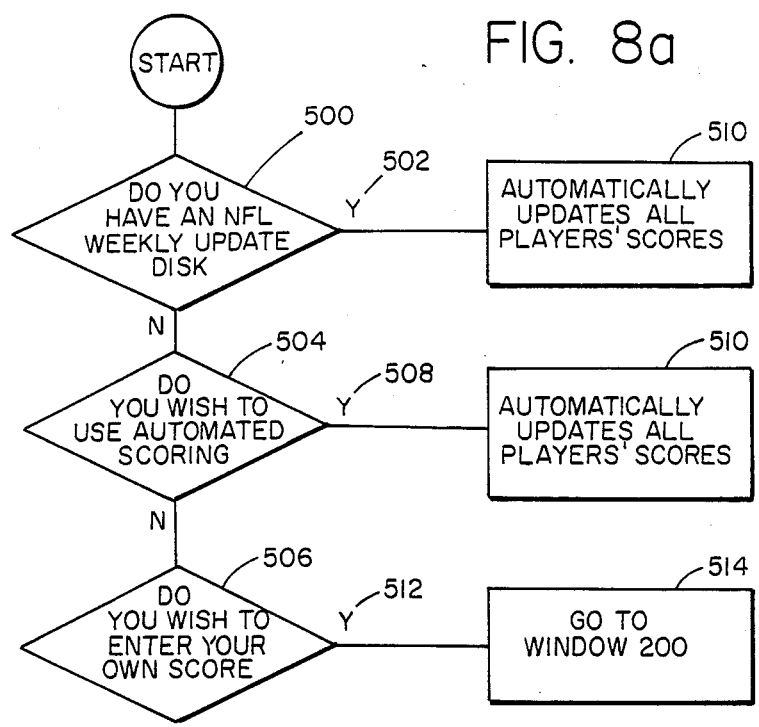

To enter the UPDATE WEEKLY SCORING program, the user must select the Update Weekly Scoring Option 22 in FIG. 2. The software then prompts the user as shown in FIG. 8a querying the user whether they have an NFL weekly update disk 500. If the answer is yes 502, the prompt bar is used to select the answer. If the choice is no, a second window appears (not shown) prompting the user as to whether they care to use the automated scoring facility 404 or to use their own league scoring method 506. If the league is using the automated scoring diskettes, the prompt bar is used to select the "Yes" choice and the ENTER Key is pressed 508. The program then automatically updates the player's scores at step 510. The automated updating process is made visible by the window 240 shown in FIG. 8c. As the scores for each player are processed, the player's names 244 and the NFL city 246 will flash on the screen. Other information such as the week of the season 242 also will be automatically updated.

Returning to FIG. 8a, if the league uses their scoring method, the user then answers yes at step 512 and presses the ENTER key. A window 200, as shown in FIG. 8b, will then appear at step 514.

Window 200 includes an inner window 202 which allows the user to select between options 204, 206, and 207. More particularly, option 204 allows the Commissioner to enter the detailed score for each NFL Player in the league (as will be described in more detail below with respect to FIGS. 8c–8d). The operation of option 206 is identical to that of option 204. The update for the week 207 can also be selected by moving the prompt bar 68 down to the appropriate choice and pressing the ENTER Key.

When options 204 or 206 are chosen in this manner, a window 220 (FIG. 8c) appears. This window includes an outer window 222 and an inner window 224 listing all of the available franchises. The prompt bar 68 is then placed over the desired franchise and the franchise is selected by pressing the ENTER Key.

A window 228 as shown in FIG. 8c then appears. This window lists, in alphabetical order, all of the players 234 who play for the franchise 230. Adjacent the player list 234 is a score column 232. Depending upon whether the Commissioner has chosen the summary or detailed score options, the Commissioner will then type in the points for each player in column 236.

If the detailed score option is selected, the score in column 232 can be broken down in any desired manner. As an example, the score can be broken down into yards rushing or passing. A more detailed breakdown of each score can be provided as desired.

The number of points assigned to each player is based on the player's actual score in the previous week's NFL games. This information must be calculated by the Commissioner before entering the scores. The scores are then entered by typing the score next to each player and pressing the ENTER key. When the Commissioner finishes entering the scores for the first franchise, he will press option key "F10" 238. The franchise window will then re-appear allowing the Commissioner to update the second franchise's score. Once each player's scores have been entered, the Commissioner activates the function Key "F10" 226 in FIG. 8b causing total scores for each team to be automatically calculated. When the calculation of scores is completed, the display will return the Commissioner to the MAIN MENU program 12.

The third option, "Update for Week nn," uses the automatic scoring program described above with reference to FIG. 8e. The automatic scoring option algorithm is described below.

2. Playing the UPDATE WEEKLY SCORING program

The computerized football program is accompanied by a weekly update service that will automatically tabulate the scoring for each player. The automated scoring system is based upon the actual plays made by NFL players each week during the regular season. Only those players listed as starters on the supplied diskettes will receive points. Computerized football points are awarded for touchdowns, field goals, and points after touchdowns. Bonus points also are awarded based upon the difficulty of the play. Factors contributing to the difficulty measure include yardage and the rarity of play.

Points are based upon the actual NFL game scores of three groups of players.

Group 1. Quarterbacks, Running Backs and Pass Receivers

Points are earned for each of these players by touchdowns scored by a quarterback, running back, or pass receiver. Thus, the player throwing the touchdown pass, the player catching the touchdown pass, or the player running the touchdown each receive individual points. The points are based upon the number of yards that were involved in the touchdown play. A play that is 1-9 yards receives 6 points. For plays that are 10-39 yards, 9 points are received by the touchdown scoring team. Finally, for those touchdowns of 40 yards and over, 12 points are received.

Quarterbacks, running backs, and pass receivers can also get bonus points. The bonus points are awarded to a quarterback who receives a pass or runs for the touchdown. A running back receives bonus points when he has either thrown or received the touchdown pass. Similarly, the pass receiver can achieve the bonus points for passing the ball or running for the touchdown.

The bonus points are awarded on the basis of 1.5 times the normal point value for that touchdown score. Accordingly, touchdowns of 1-9 yards receive 9 points, touchdowns 10-39 yards receive 13.5 points and touchdowns of over 40 yards receive 18 points.

As an example of the calculation, if a Quarterback runs for a 6-yard touchdown, he receives 6 points times 1.5, which equals 9 points. When a running back throws a 25-yard touchdown pass, he receives a total of 13.5 Points (9×1.5). The pass receiver who runs for a 45-yard touchdown receives 18 Points (12×1.5).

Additional bonus points are provided for fumbles that result in touchdowns or for lateral recoveries in the end zone. The bonus points for each of these scores are 9 Points.

Group 2: Kickers

Kickers receive the following points for field goals:
1-39 yards equals 3 Points
40-49 yards equals 5 Points
50-over equals 10 Points.

For points made after touchdowns, kickers receive 1 Point.

Kickers also receive bonus points. These points are awarded when a kicker scores a touchdown. The number of bonus points are based on 1.5 times the normal value for that score. Thus, the number of bonus points is identical to that for quarterbacks, running backs and pass receivers.

An example of how a Kicker's score is tabulated is as follows: If a Kicker fakes a field goal and then catches a 25-yard touchdown pass, he receives a total of 13.5 Points (9 Points ×1.5). The scoring system, however, does not award points for players running or catching passes for extra points.

Group 3: Special Teams Players, Linebackers and Defensive Backs

Points are awarded to any touchdown scored by a special teams player, a Linebacker or a defensive end. The total number of points available to any of the players is the same: 25 points. Touchdowns by these players can be scored in any desirable way. Scores can, for example, include blocked punts, kick-off returns, punt returns and lateral passes occurring during a special teams play.

I. The Functions of the Computerized Football Game program

Figure 9:
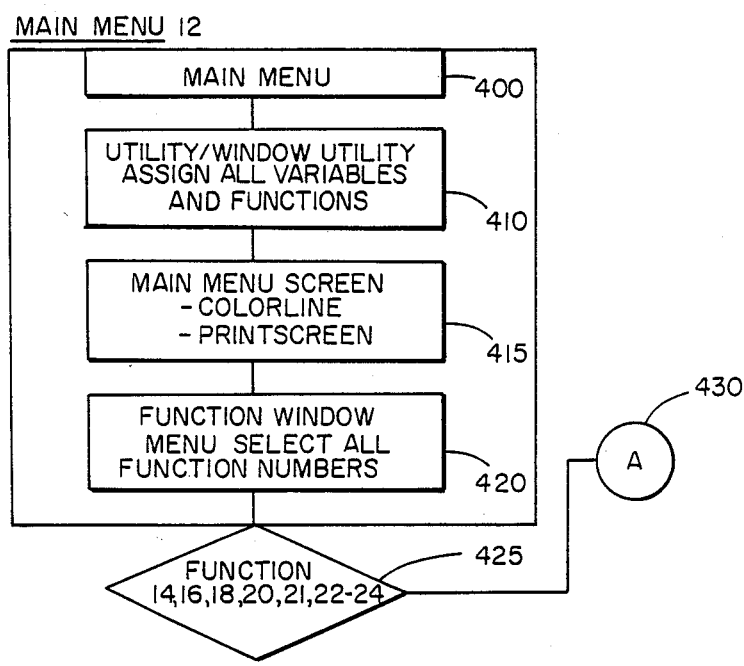
FIG. 9 is a schematic flow diagram of the functions of the MAIN MENU program of FIG. 2.

Referring now to FIG. 9, an illustration of the software is provided. More particularly, FIG. 9 illustrates the sequence of operations and functions that form the MAIN MENU Program 12.

Briefly, when the MAIN MENU is accessed at 400, all of the automatic variables for the various window displays are assigned at step 410. The color in the MAIN MENU screens is then filled in at step 415. At step 420, the menu of all the functions is accessed from the database and displayed to the user. The user then chooses one of the seven available functions which are called at step 410.

Referring to FIG. 10, the organization of each of the programs 14, 16, 18, 20, 21, 22 and 24 is shown. The basic parts of these functions are described briefly.

The subroutine function 432 begins with a UTILITY subroutine 435. That UTILITY subroutine initializes all of the variables as well as the window display format. A WINDOW UTILITY Function 440 is then called.

The WINDOW UTILITY may be called at any point in the program. The reason for this is that the WINDOW UTILITY function is employed to set up the window, move the prompt bar, and display the data inside the window.

The GET DISK 445 and PUT DISK 450 subroutines are then called by the function's software. The purpose of each of these functions is to read information off of the disk or diskette and then write information inputted by the user onto the disk. Normally, these routines are used throughout the entire function as a means for updating the database.

The GET function is used to open files and retrieve the file size.

The FUNCTION function 460 differs in each of the subprograms. In almost all instances except the UPDATE WEEKLY SCORING program 22, the FUNCTION subroutine 460 controls all of the prompting described previously.

The NEXT function 465 provides a wait loop until the NEXT key is selected. Once the NEXT Key is actuated, the ASSIGNED subroutine 470 is called. This subroutine acts to assign rows and columns to the window.

The PROMPT function 475 controls the prompt bar command; the DISPLAY function 480 paints the screen various colors, and the Index (FABS) program 485 provides a variety of indexes to be used in accessing the program's database.

FIG. 11 displays a variety of the window functions that form part of the WIND UTIL program 440 briefly mentioned in FIG. 10. As this program can be used at any point during the program, the various functions of WIND UTIL, will be described in their order in FIG. 11.

Specifically, the INIT Window function 510 sets up the window parameters for display The DISPLAY WINDOW function 515 displays the window on the screen. The DELETE WINDOW function 520 deletes the window and then displays items located underneath the window. The PRINT BOX function 525 prints the outline of the box that contains the windowed information on the screen. The WINDBARDOWN function 530 moves the prompt bar down one line. PLACE-WINDBAR function 535 places a prompt bar inside the window. The DELETEWINDOWBAR function 540 takes the prompt bar out of the window completely. The DISPWIND function 545, in turn, displays data in the window while the READ WINDOW function 550 displays a line/read window and fills up the window with variables. The WINDLINEDOWN function 550 and WINDLINEUP function 560 control the scrolling of the window in response to the "PG-UP" and "PG-DN" keys. The INPWINDOW 565 allows a display of options in the heading and provides for a prompting window. Finally, the WIND MENU option 570 provides a list of all of the options available in a given window.

Although only a preferred embodiment is specifically illustrated and described herein, it will be appreciated that many modifications and variations of the present invention to other types of sports are possible in light of the above teachings and within purview of the appended claims without departing from the spirit and intended scope of the invention.

What is claimed is:

1. A computer for playing football based upon actual football games, comprising:
   means for setting up individual football franchises;
   means for drafting actual football players into said franchises;
   means for selecting starting player rosters from said actual football players;
   means for trading said actual football players;
   means for scoring performances of said actual football players based upon actual game scores such that franchises automatically calculate a composite win or loss score from a total of said individual actual football players' scores;
   said players' scores are for quarterbacks, running backs and pass receivers in a first group and kickers in a second group; and
   wherein said players in said first and second groups receive bonus points.

2. The apparatus according to claim 1, wherein said bonus points for said first and seconds groups are based upon complex or difficult plays.

3. The apparatus according to claim 2, wherein said complex and difficult plays include extra points for a quarterback who receives or runs for said touchdown, extra points for said running back for throwing or receiving a touchdown pass, and extra points for said pass receive for passing the ball or running for a touchdown.

* * * * *